United States Patent
Yu et al.

(10) Patent No.: US 8,427,623 B2
(45) Date of Patent: Apr. 23, 2013

(54) THIN FILM TRANSISTOR SUBSTRATE INCLUDING DISCONNECTION PREVENTION MEMBER

(75) Inventors: Se-Hwan Yu, Asan-si (KR);
Hyang-Shik Kong, Seongnam-si (KR);
Su-Hyoung Kang, Bucheon-si (KR)

(73) Assignee: Samsung Display Co., Ltd., Yongin (KR)

( * ) Notice: Subject to any disclaimer, the term of this patent is extended or adjusted under 35 U.S.C. 154(b) by 210 days.

(21) Appl. No.: 12/816,591

(22) Filed: Jun. 16, 2010

(65) Prior Publication Data

US 2011/0025968 A1  Feb. 3, 2011

(30) Foreign Application Priority Data

Aug. 3, 2009  (KR) .......................... 10-2009-0071434

(51) Int. Cl.
*G02F 1/1333* (2006.01)
*G02F 1/1343* (2006.01)
*G02F 1/1345* (2006.01)

(52) U.S. Cl.
USPC ............... 349/152; 349/42; 349/43; 349/139; 349/149; 349/151

(58) Field of Classification Search .................. 349/139, 349/149, 42–43, 151–152
See application file for complete search history.

(56) References Cited

U.S. PATENT DOCUMENTS

| | | | | |
|---|---|---|---|---|
| 2001/0025958 A1* | 10/2001 | Yamazaki et al. | ............... | 257/72 |
| 2005/0030465 A1* | 2/2005 | Park et al. | ...................... | 349/149 |
| 2005/0158900 A1* | 7/2005 | Lee et al. | ......................... | 438/30 |
| 2007/0197019 A1* | 8/2007 | Kang et al. | .................... | 438/620 |

\* cited by examiner

*Primary Examiner* — Lauren Nguyen
(74) *Attorney, Agent, or Firm* — H.C. Park & Associates, PLC

(57) ABSTRACT

A thin film transistor array panel including a display area having a gate line, a data line insulated from and intersecting the gate line, a thin film transistor connected to the gate line and the data line, and a pixel electrode connected to the thin film transistor, and a peripheral area formed on the circumference of the display area, according to an exemplary embodiment of the present invention, includes: a driving signal line formed with the same layer as the gate line in the peripheral area and receiving an external signal; a connection signal line formed with the same layer as the data line in the peripheral area; a disconnection prevention member overlapping the side surface of the connection signal line on the connection signal line; and a connection assistance member formed on the disconnection prevention member and connecting the driving signal line and the connection signal line.

18 Claims, 5 Drawing Sheets

THIN FILM TRANSISTOR SUBSTRATE INCLUDING DISCONNECTION PREVENTION MEMBER

CROSS REFERENCE TO RELATED APPLICATION

This application claims priority from and the benefit of Korean Patent Application No. 10-2009-0071434, filed on Aug. 3, 2009, which is hereby incorporated by reference for all purposes as if fully set forth herein.

BACKGROUND OF THE INVENTION

1. Field of the Invention

Exemplary embodiments of the present invention relate to a thin film transistor array panel.

2. Discussion of the Background

Generally, a display device includes a display panel having a thin film transistor array panel provided with a gate line, a data line, a pixel electrode, and a thin film transistor, and a common electrode panel, a gate driver that outputs a gate signal to the gate line, and a data driver that outputs a data signal to the data line.

The gate driver and the data driver may be mounted to the display panel in the form of a chip. However, in recent years, the gate driver has been integrated into the display panel in order to reduce the overall size of a display device and to improve the productivity thereof.

A liquid crystal panel as a representative display panel includes a thin film transistor array panel provided with the gate line, the data line, the pixel electrode, and the thin film transistor, the common electrode panel facing the thin film transistor array panel, and a liquid crystal layer interposed between the thin film transistor array panel and the common electrode panel.

In the structure in which the gate driver is integrated in the thin film transistor array panel of the display panel, the gate driver may be positioned at the outer part thereof such that the etching uniformity is lower than the display area. Therefore, it is easy for the side of the connection signal line formed with the same layer as the data line to be reverse-tapered. In this case, a connection assistance member overlapping the connection signal line and formed on the connection signal line may be disconnected. For preventing the disconnection, the thickness of indium zinc oxide (IZO) as a material of the connection assistance member may be increased and the connection signal line is managed to not be reverse-tapered, however the cost and the process time are increased.

The above information disclosed in this Background section is only for enhancement of understanding of the background of the invention and therefore it may contain information that is not part of the prior art.

SUMMARY OF THE INVENTION

Exemplary embodiments of the present invention prevent disconnection of a connection assistance member formed in a gate driver.

Additional features of the invention will be set forth in the description which follows, and in part will be apparent from the description, or may be learned by practice of the invention.

An exemplary embodiment of the present invention discloses a thin film transistor array panel including a display area having a gate line, a data line insulated from and crossing the gate line, a thin film transistor connected to the gate line and the data line, and a pixel electrode connected to the thin film transistor. A peripheral area is formed on a periphery of the display area and includes a driving signal line formed with the same layer as the gate line in the peripheral area and the driving signal line receiving an external signal. A connection signal line is formed in the peripheral area with the same layer as the data line. A disconnection prevention member overlaps the side surface of the connection signal line on the connection signal line. A connection assistance member is formed on the disconnection prevention member and connects the driving signal line and the connection signal line.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

Figure 1:
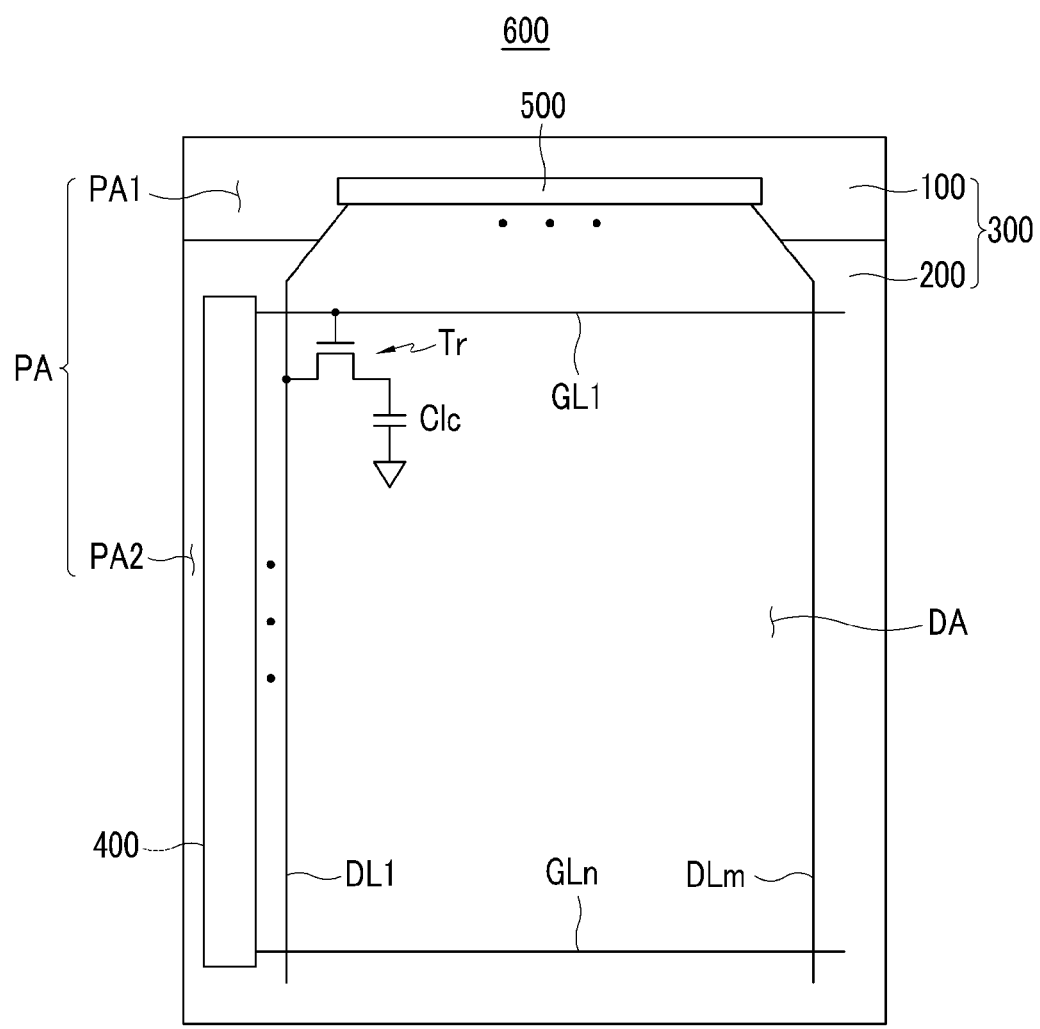
FIG. 1 is a top plan view of a display device including a thin film transistor array panel according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on or directly connected to the other element or intervening elements may be present. In contrast, when an element is referred to as being "directly on" or "directly connected to" another element, there are no intervening elements present.

Now, a thin film transistor array panel according to an exemplary embodiment of the present invention will be described in detail with reference to the accompanying drawings.

FIG. 1 is a top plan view of a display device including a thin film transistor array panel according to an exemplary embodiment of the present invention.

As shown in FIG. 1, a display device 600 according to an exemplary embodiment of the present invention includes a display panel 300 to display images in response to a data signal and a gate signal, and a data driver 500 and a gate driver 400 provided with the display panel 300 to respectively output a data signal and a gate signal to the display panel 300.

The display panel 300 includes a thin film transistor array panel 100, a common electrode panel 200 facing the thin film transistor array panel 100, and a liquid crystal layer (not shown) interposed between the thin film transistor array panel 100 and the common electrode panel 200.

The display panel 300 may be divided into a display area DA for displaying images and a peripheral area PA enclosing the display area DA. The peripheral area PA includes a first peripheral area PA1 as a region where the data driver 500 is positioned and a second peripheral area PA2 as a region where the gate driver 400 is positioned.

Viewed as an equivalent circuit, the display panel 300 includes a plurality of gate lines GL1-GLn, a plurality of data lines DL1-DLm, and a plurality of pixels connected thereto.

The gate lines GL1-GLn and the data lines DL1-DLm are formed on a substrate 110 (FIG. 3) of the thin film transistor array panel 100. The gate lines GL1-GLn and the data lines DL1-DLm are insulated from one another and cross each other in the display area DA. The gate lines GL1-GLn extend to the second peripheral area PA2 and the data lines DL1-DLm extend to the first peripheral area PA1 thereby being connected to the gate driver 400 and the data driver 500, respectively.

Each pixel includes a thin film transistor Tr disposed in the display area DA and connected to the respective gate line GL1-GLn and the respective data line DL1-DLm, and a liquid crystal capacitor Clc connected thereto.

The thin film transistor Tr is disposed on the thin film transistor array panel 100, and includes a control terminal connected to the respective gate line GL1-GLn, an input terminal connected to the respective data line DL1-DLm, and an output terminal connected to the respective liquid crystal capacitor Clc. The thin film transistor Tr may be made of amorphous silicon or polysilicon.

A data driver 500 in a form of a chip is mounted on the thin film transistor array panel 100 in the first peripheral area PA1. The data driver 500 is electrically connected to the data lines DL1-DLm, thereby applying the data signal thereto.

Meanwhile, the gate driver 400 is formed in the thin film transistor array panel 100 in the second peripheral area PA2. The gate driver 400 is electrically connected to the gate lines GL1-GLn, thereby applying the gate signal thereto.

Next, the structure of the display unit of the thin film transistor array panel 100 will be described in detail with reference to the accompanying drawings.

Figure 2:
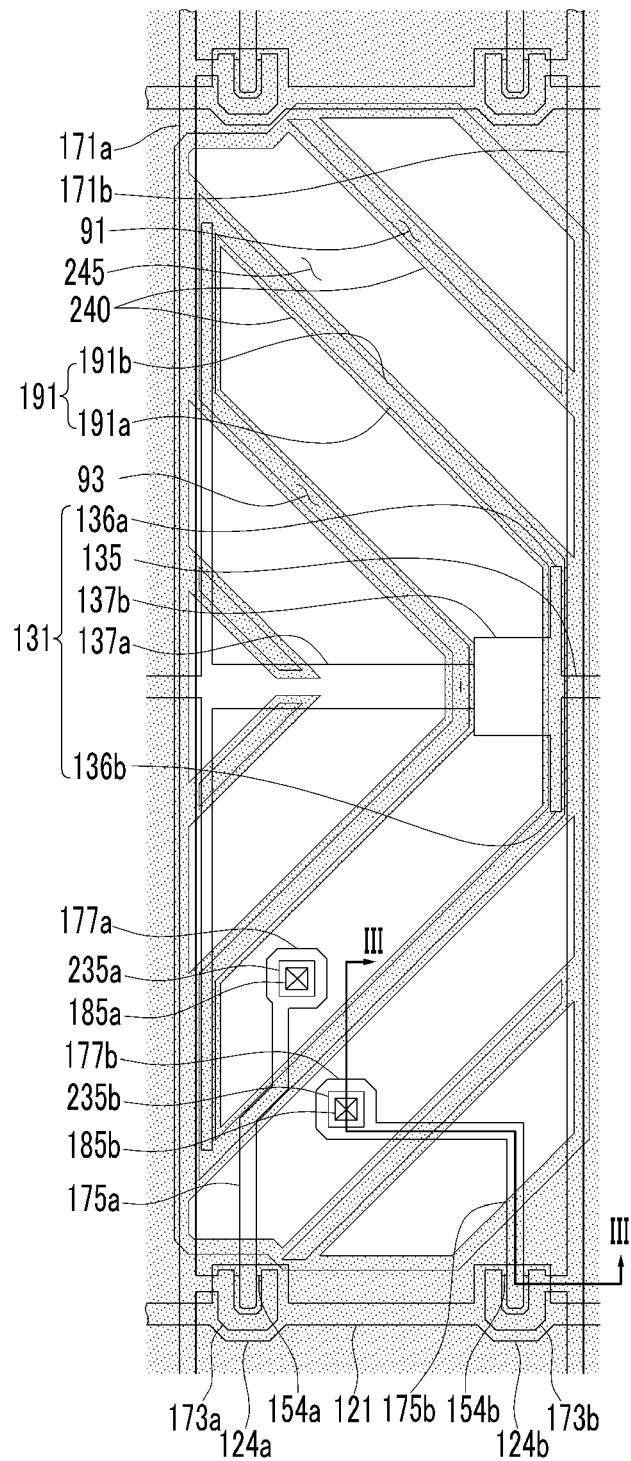
FIG. 2 is an enlarged view of a display area of the thin film transistor array panel shown in FIG. 1.
Figure 3:
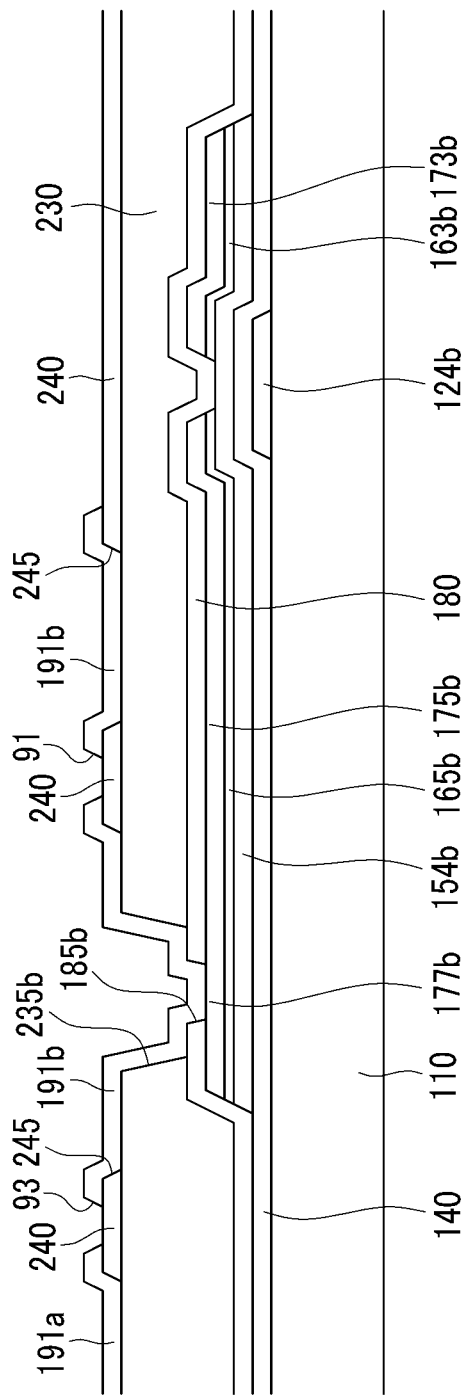
FIG. 3 is a cross-sectional view taken along line III-III of FIG. 2.

FIG. 2 is an enlarged view of a display unit according to the thin film transistor array panel shown in FIG. 1, and FIG. 3 is a cross-sectional view taken along line III-III of FIG. 2.

As shown in FIG. 2 and FIG. 3, a plurality of gate lines 121 and a plurality of storage electrode lines 131 are formed on an insulation substrate 110 preferably made of transparent glass or plastic.

The gate lines 121 transmit gate signals and extend substantially in a transverse direction. Each gate line 121 includes a plurality of gate electrodes 124a and 124b protruding upward and downward.

The storage electrode lines 131 receive a predetermined voltage, and include a stem extending parallel to the gate lines 121. Each storage electrode line 131 is disposed between two neighboring gate lines 121, and maintains the same distance from the two gate lines 121. Each of the storage electrode lines 131 includes a first storage electrode 137a, a second storage electrode 137b, a first branch electrode 136a, a second branch electrode 136b, and a connection 135. The first storage electrode 137a and the second storage electrode 137b are approximately rectangular and are connected to each other. The transverse length of the first storage electrode 137a is greater than that of the second storage electrode 137b, and the longitudinal length of the first storage electrode 137a is less than that of the second storage electrode 137b. The first branch electrode 136a is connected to the first storage electrode 137a and extends in the longitudinal direction toward the gate line 121. The first branch electrode 136a is very narrow in the transverse direction. The second branch electrode 136b is connected to the end of the second storage electrode 137b and extends in the longitudinal direction toward the gate line 121, and the transverse length thereof is very short. The connection 135 connects the branch electrode 136 to the neighboring first storage electrode 137a, and the longitudinal length thereof is short compared with the first and second storage electrodes 137a and 137b. However, the shapes and arrangements of the storage electrode lines 131 can be modified in various forms.

A gate insulating layer 140 formed of silicon nitride (SiNx) or silicon oxide (SiOx) is formed on the gate lines 121 and the storage electrode lines 131.

A plurality of first and second semiconductor islands 154a and 154b, for example, formed of hydrogenated amorphous silicon (simply referred to as a-Si) or polysilicon, are formed on the gate insulating layer 140. The first semiconductor islands 154a overlap the first gate electrodes 124a and the second semiconductor islands 154b overlap the second gate electrodes 124b.

A pair of first ohmic contact islands (not shown) are formed on the first semiconductor island 154a, and a pair of second ohmic contact islands 163b and 165b are formed on the second semiconductor island 154b. The first and second ohmic contacts (not shown, and 163b and 165b) may be formed of a material such as n+ hydrogenated amorphous silicon in which an n-type impurity is doped with a high concentration, or of silicide.

A plurality of first and second data lines 171a and 171b and a plurality of first and second drain electrodes 175a and 175b are formed on the first and second ohmic contacts (not shown, and 163b and 165b), and on the gate insulating layer 140.

The first and second data lines 171a and 171b transmit data signals, extend substantially in the longitudinal direction, and cross the gate lines 121 and the connections 135 of the storage electrode lines 131. The first data line 171a includes a first source electrode 173a that is extended toward the first gate electrode 124a and is curved with a "U" shape. Likewise, the second data line 171b includes a second source electrode 173b that is extended toward the second gate electrode 124b and is curved with a "U" shape.

The drain electrodes 175a and 175b are separated from the data lines 171a and 171b. Each drain electrode 175a and 175b includes one end enclosed by the source electrodes 173a and 173b and the other end having a wide end portion 177a and 177b. The plane shape of the drain electrodes 175a and 175b may be variously changed.

The first gate electrode 124a, the first source electrode 173a, and the first drain electrode 175a form a first thin film transistor (TFT) along with the first semiconductor island 154a, and the channel of the first thin film transistor is formed in the first semiconductor island 154a between the first source electrode 173a and the first drain electrode 175a. The second gate electrode 124b, the second source electrode 173b, and the second drain electrode 175b form a second thin film transistor (TFT) along with the second semiconductor island 154b, and the channel of the second thin film transistor is formed in the second semiconductor island 154b between the second source electrode 173b and the second drain electrode 175b.

The first pair of ohmic contacts (not shown) and the second pair of ohmic contacts 163b and 165b only exist between the semiconductor islands 154a and 154b below, and the data lines 171a and 171b and drain electrodes 175a and 175b above, and reduce contact resistance between them. The semiconductor islands 154a and 154b have portions that are exposed without being covered by the data lines 171a and 171b and the drain electrodes 175a and 175b, including a region between the source electrodes 173a and 173b and drain electrodes 175a and 175b.

A passivation layer 180 is formed on the source electrodes 173a and 173b, the drain electrodes 175a and 175b, and the exposed semiconductor islands 154a and 154b. The passivation layer 180 may be made of an inorganic insulator such as silicon nitride or silicon oxide. However, the passivation layer 180 may be omitted.

The passivation layer 180 has contact holes 185a and 185b respectively exposing the wide end portions 177a and 177b of the drain electrodes 175a and 175b.

A color filter 230 is formed on the passivation layer 180. The color filter 230 is arranged between the first data line 171a and the second data line 171b, and may be elongated in a vertical direction along the data lines 171a and 171b to form a stripe. The boundary of two neighboring color filters 230 may be disposed between two nearest data lines 171a and 171b such that the two color filters 230 overlap each other to serve as a light blocking member blocking light leakage generated between the pixel electrodes 191. The color filters 230 may represent one of three primary colors such as red, green, and blue, and may be made of a photosensitive organic material including pigments.

The color filters 230 have through holes 235a and 235b through which the contact holes 185a and 185b are exposed. The through holes 235a and 235b are larger than the contact holes 185a and 185b.

A capping layer 240 made of an inorganic insulator such as silicon nitride or silicon oxide is formed on the color filter 230. The capping layer 240 includes a straight portion overlapping the gate line 121 and the data lines 171a and 171b, and an oblique portion forming an angle, for example, an angle of 45 degrees, with the gate line 121. The capping layer 240 is removed between neighboring oblique portions to form an opening 245 exposing the color filter 230.

A pixel electrode 191 is formed on the capping layer 240. The pixel electrode 191 may be made of a transparent conductive material such as indium tin oxide (ITO) or IZO, or a reflective metal such as aluminum, silver, chromium, or alloys thereof.

The pixel electrode 191 includes a first sub-pixel electrode 191a and a second sub-pixel electrode 191b that is larger than the first sub-pixel electrode 191a.

The first sub-pixel electrode 191a has a band shape approximating a less-than sign (<), and is enclosed by the second sub-pixel electrode 191b via a gap 93 interposed therebetween. The second sub-pixel electrode 191b has a plurality of cutouts 91 with a straight band shape, and the cutouts 91 form an angle of about 45 degrees with the gate lines 121 and the data lines 171a and 171b. The gap 93 includes a plurality of oblique portions substantially parallel to the cutouts 91, and a plurality of longitudinal portions substantially parallel to the data lines 171a and 171b.

The cutouts 91 of the second sub-pixel electrode 191b and the gap 93 between the first sub-pixel electrode 191a and the second sub-pixel electrode 191b overlap the oblique portion of the capping layer 240. The capping layer 240 covers the color filter 230 that is not covered by the first sub-pixel electrode 191a and the second sub-pixel electrode 191b.

The first and second sub-pixel electrodes 191a and 191b have almost the same shape as the opening 245, and the majority thereof is disposed in the opening 245. If the opening 245 is formed in the manner described, stress generated by the capping layer 240 may be reduced, and lifting at the interface between the capping layer 240 and the color filter 230 may be prevented such that the active unfilled area (AUA) deterioration may be prevented. Also, the capping layer 240 and the pixel electrode 191 cover the whole color filter 230 such that they may prevent the color filter 230 from being lifted off of the substrate 110 and suppress contamination of the liquid crystal layer by an organic material such as a solvent from the color filter 230, and thereby problems such as an afterimage that may be generated under driving may be prevented.

The first sub-pixel electrode 191a is connected to the first drain electrode 175a of the first thin film transistor through the contact hole 185a. The second sub-pixel electrode 191b is connected to the second drain electrode 175b of the second thin film transistor through the contact hole 185b. The first sub-pixel electrode 191a receives data voltages from the first drain electrode 175a. The second sub-pixel electrode 191b receives data voltages from the second drain electrode 175b. The first sub-pixel electrode 191a and the second sub-pixel electrode 191b applied with the data voltages generate an electric field along with a common electrode (not shown) of the common electrode panel 200 such that the orientation of the liquid crystal molecules (not shown) of the liquid crystal layer (not shown) between the first sub-pixel electrode 191a and the second sub-pixel electrode 191b and the common electrode is determined. Accordingly, the luminance of the light transmitted through the liquid crystal layer differs depending on the determined orientation of the liquid crystal molecules.

Next, the structure of the second peripheral area PA2 of the thin film transistor array panel 100 including the gate driver 400 will be described in detail with reference to the accompanying drawings.

Figure 4:
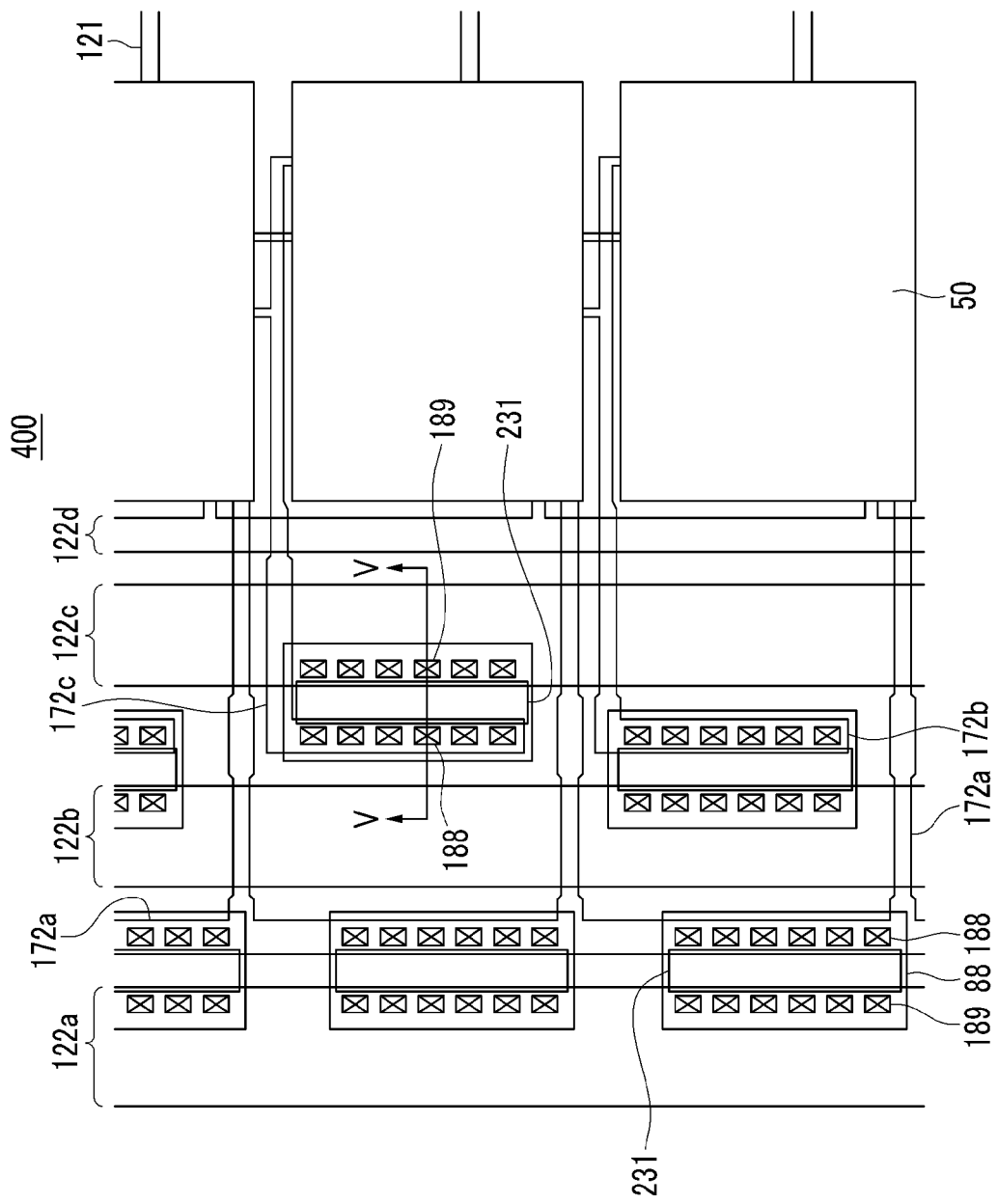
FIG. 4 is an enlarged view of a peripheral area of the thin film transistor array panel shown in FIG. 1.
Figure 5:
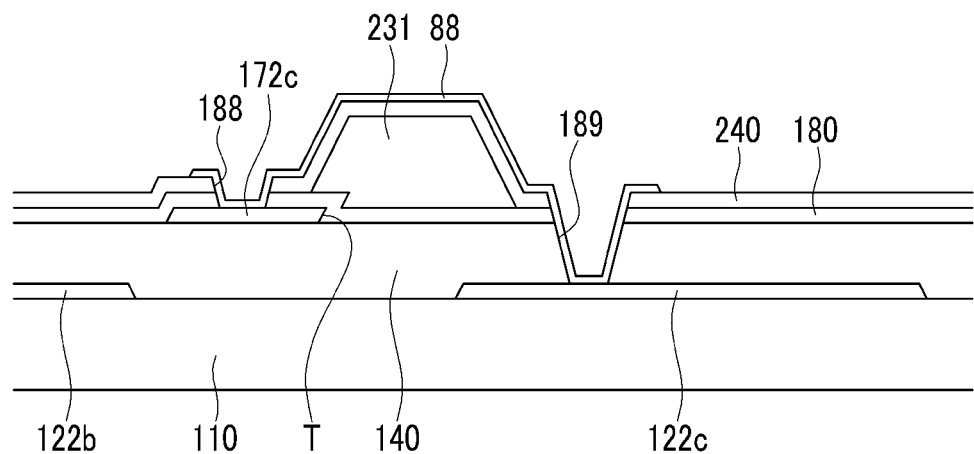
FIG. 5 is a cross-sectional view taken along line V-V of FIG. 4.

FIG. 4 is an enlarged view of the second peripheral area PA2 of the thin film transistor array panel 100 shown in FIG. 1, and FIG. 5 is a cross-sectional view taken along line V-V of FIG. 4.

As shown in FIG. 4 and FIG. 5, a gate driver 400 connected to the gate line 121 is formed in the second peripheral area PA2 of the thin film transistor substrate.

The gate driver 400 sequentially outputs the gate signal, and includes shift registers 50 respectively corresponding and connected to the gate lines 121, a plurality of driving signal lines 122a, 122b, 122c, and 122d, and a plurality of connection signal lines 172a, 172b, and 172c transmitting various signals Voff, CLK1, CLK2, and INT input to the shift registers 50.

The shift registers 50 include a plurality of driving thin film transistors (not shown) outputting the gate signals to the gate lines 121 according to the various signals Voff, CLK1, CLK2, and INT.

The driving signal lines 122a, 122b, 122c, and 122d are formed with the same layer as the gate lines 121 on the insulation substrate 110, and include a gate-off voltage line 122a transmitting the gate-off voltage Voff, first and second clock signal lines 122b and 122c respectively transmitting first and second clock signals CLK1 and CLK2, and an initialization signal line 122d transmitting an initialization signal INT.

The gate-off voltage line 122a, the first and second clock signal lines 122b and 122c, and the initialization signal line 122d are extended mainly in the longitudinal direction, and the initialization signal line 122d has a plurality of branches extending toward each shift register 50 in the transverse direction.

The driving signal lines 122a, 122b, 122c, and 122d may be made of aluminum-containing metals, such as aluminum and aluminum alloys, silver-containing metals, such as silver and silver alloys, copper-containing metals, such as copper and copper alloys, molybdenum-containing metals, such as molybdenum and molybdenum alloys, chromium, titanium, tantalum, and so forth. The gate insulating layer 140 made of silicon nitride ($SiN_x$) is formed on the driving signal lines 122a, 122b, 122c, and 122d.

A plurality of connection signal lines 172a, 172b, and 172c are formed on the gate insulating layer 140. The connection signal line 172a includes a stem disposed between the gate-off voltage line 122a and the first clock signal line 122b and mainly extending in the longitudinal direction, and a plurality of branches extending from the stem toward the shift registers 50 in the transverse direction. The connection signal lines 172b and 172c respectively include a longitudinal portion disposed between the first clock signal line 122b and the second clock signal line 122c and mainly extending in the longitudinal direction, and a plurality of transverse portions connected to the end of the longitudinal portion and extending toward the shift registers 50 in the transverse direction.

The connection signal lines 172a, 172b, and 172c may be made of a refractory metal such as a molybdenum-containing metal, chromium, tantalum, and titanium, and may have a multilayer structure including an upper layer having low resistance and a lower layer having a good contact characteristic.

The respective side surface T of the connection signal lines 172a, 172b, and 172c is inclined with respect to a surface of the substrate 110, and the inclination angle is preferably in a range from about 30 to 80 degrees. However, the connection signal lines 172a, 172b, and 172c are disposed in the gate driver 400 outside of the display area DA such that the respective side surface T of the connection signal lines 172a, 172b, and 172c may be reverse-tapered due to the low etching uniformity compared with the display area DA.

The passivation layer 180 that may be made of the inorganic material such as silicon nitride is formed on the connection signal lines 172a, 172b, and 172c.

A disconnection prevention member 231 is formed on the passivation layer 180. The disconnection prevention member 231 may be made of the same material as the color filter 230, and overlaps the connection signal lines 172a, 172b, and 172c while covering the side surfaces T of the connection signal lines 172a, 172b, and 172c.

In the exemplary embodiment of FIG. 4 and FIG. 5, the disconnection prevention member 231 is formed only on the portion overlapping the side surface T of the respective connection signal lines 172a, 172b, and 172c, however the disconnection prevention member 231 may be formed on the whole region of the gate driver 400.

The capping layer 240 (overcoat) is formed on the disconnection prevention member 231 and the passivation layer 180 like the display area DA, the passivation layer 180 and the capping layer 240 have a plurality of contact holes 188 exposing the ends of the connection signal lines 172a, 172b, and 172c, and the gate insulating layer 140, the passivation layer 180, and the capping layer 240 have a plurality of contact holes 189 exposing the driving signal lines 122a, 122b, 122c, and 122d.

A connection assistance member 88 made of ITO or IZO is formed on the capping layer 240.

The connection assistance member 88 is connected to the driving signal lines 122a, 122b, 122c, and 122d and the connection signal lines 172a, 172b, and 172c through the contact holes 189 and 188, respectively, thereby receiving the various signals from the driving signal lines 122a, 122b, 122c, and 122d, and transmitting them to the connection signal lines 172a, 172b, and 172c. The connection assistance member 88 may be largely formed and not divided as shown in the illustrated embodiment because the connection assistance member 88 is transparent thereby passing light without a reduction by the connection assistance member 88, and the resistance is decreased as the size of the connection assistance member 88 is increased. Also, if the contact holes 188 and 189 are formed for the connection, the possibility of disconnection of the connection assistance member 88 is reduced.

Also, although the side surface T of each of the connection signal lines 172a, 172b, and 172c is reverse-tapered, the disconnection prevention member 231 is formed on the portion overlapping the side surfaces T of the connection signal lines 172a, 172b, and 172c such that the connection assistance member 88 may be prevented from being directly formed on the reverse-tapered shape, and accordingly, the connection assistance member 88 is not disconnected.

Unlike the above-described embodiment, the driving signal lines 122a, 122b, 122c, and 122d may be formed with the same layer as the data line 171, the connection signal lines 172a, 172b, and 172c may be formed with the same layer as the gate line 121, and various methods may be applied.

Figure 6:
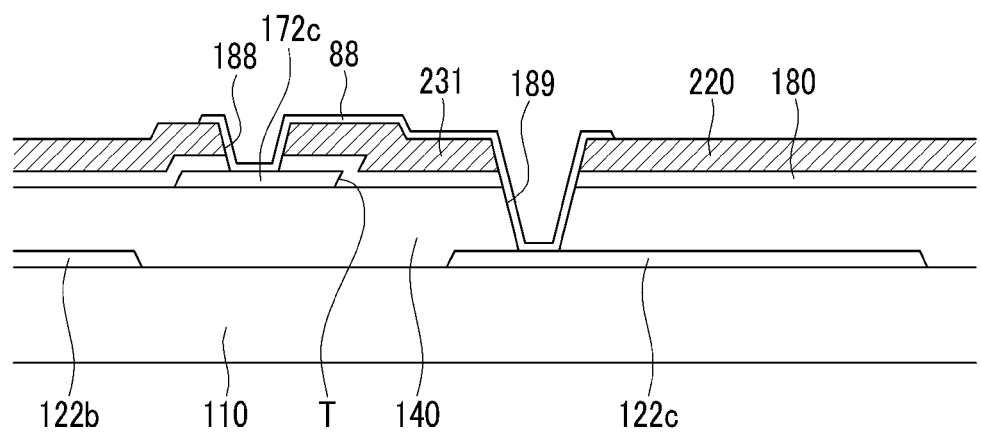
FIG. 6 is a cross-sectional view of a thin film transistor array panel according to another exemplary embodiment of the present invention.

FIG. 6 is a cross-sectional view of a thin film transistor array panel 100 according to another exemplary embodiment of the present invention.

The present exemplary embodiment is substantially the same as the exemplary embodiment shown in FIG. 5 except that the disconnection prevention member 231 is formed of a black matrix, such that overlapping description is omitted.

As shown in FIG. 6, the driving signal lines 122a, 122b, 122c, and 122d are formed on an insulation substrate 110, and a gate insulating layer 140 made of silicon nitride $SiN_X$ is formed on the driving signal lines 122a, 122b, 122c, and 122d.

A plurality of connection signal lines 172a, 172b, and 172c are formed on the gate insulating layer 140. The side surfaces T of the respective connection signal lines 172a, 172b, and 172c are inclined with respect to a surface of the substrate 110, and the inclination angle is preferably in a range from about 30 to 80 degrees. However, the connection signal lines 172a, 172b, and 172c are disposed in the gate driver 400 outside of the display area DA such that the side surface T of each of the connection signal lines 172a, 172b, and 172c may be reverse-tapered due to the low etching uniformity compared with the display area DA.

The passivation layer 180 that may be made of the inorganic material such as silicon nitride is formed on the connection signal lines 172a, 172b, and 172c, and a disconnection prevention member 231 is formed on the passivation layer 180. The disconnection prevention member 231 may be formed of the same material as the black matrix, and may have the function of forming a smooth side surface T of each of the connection signal lines 172a, 172b, and 172c while covering the connection signal lines 172a, 172b, and 172c.

The passivation layer 180 and the disconnection prevention member 231 have a plurality of contact holes 188 exposing the ends of the connection signal lines 172a, 172b, and 172c, and the gate insulating layer 140, the passivation layer 180, and the disconnection prevention member 231 have a plurality of contact holes 189 exposing the driving signal lines 122a, 122b, 122c, and 122d.

A connection assistance member 88 made of ITO or IZO is formed on the disconnection prevention member 231.

The connection assistance member 88 is connected to the driving signal lines 122a, 122b, 122c, and 122d and the connection signal lines 172a, 172b, and 172c through the contact hole 189 and 188, respectively, thereby receiving the various signals from the driving signal lines 122a, 122b, 122c, and 122d, and transmitting them to the connection signal lines 172a, 172b, and 172c.

Accordingly, the disconnection prevention member 231 covers the side surface T of each of the connection signal lines 172a, 172b, and 172c thereby smoothly forming the portion overlapping the respective side surfaces T of the connection signal lines 172a, 172b, and 172c such that the connection assistance member 88 is formed on the flat or normal-tapered disconnection prevention member 231, and accordingly the disconnection of the connection assistance member 88 may be prevented.

According to exemplary embodiments of the present invention, the disconnection prevention member 231 made of the color filter or the black matrix is formed on a portion overlapping the side surface of the connection signal lines 172a, 172b, and 172c of the gate driver 400 such that disconnection of the connection assistance member 88 formed on the connection signal lines 172a, 172b, and 172c due to a reverse-taper of the side surfaces T of the connection signal lines 172a, 172b, and 172c may be prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A thin film transistor array panel, comprising:
a display area comprising:
a gate line;
a data line insulated from and crossing the gate line;
a thin film transistor connected to the gate line and the data line;
a pixel electrode connected to the thin film transistor; and
a peripheral area disposed on the periphery of the display area and comprising:
a driving signal line formed from the same layer of material as the gate line and configured to receive an external signal;
a gate insulating layer disposed on the driving signal line;
a connection signal line disposed on the gate insulating layer and formed from the same layer of material as the data line;
a disconnection prevention member overlapping a first side surface of the connection signal line; and
a connection assistance member disposed on the disconnection prevention member and connecting the driving signal line and the connection signal line,
wherein the first side surface of the connection signal line has a reverse-tapered etching profile.

2. The thin film transistor array panel of claim 1, further comprising a color filter disposed under the pixel electrode,
wherein the disconnection prevention member comprises the same type of material as the color filter.
3. The thin film transistor array panel of claim 1, further comprising a black matrix disposed in the peripheral area,
wherein the disconnection prevention member comprises the same material as the black matrix.
4. The thin film transistor array panel of claim 3, further comprising a color filter disposed under the pixel electrode.
5. The thin film transistor array panel of claim 1, further comprising a shift register disposed between the connection signal line and the gate line thereby connecting the connection signal line and the gate line, and configured to output a gate signal to the gate line in response to a signal received from the connection signal line.
6. The thin film transistor array panel of claim 5, wherein the driving signal line comprises first, second, and third signal lines configured to transmit a power voltage, a first clock signal, and a second clock signal having a different phase than the first clock signal.
7. The thin film transistor array panel of claim 6, wherein the connection signal line connects at least one of the first, second, and third signal lines to the shift register.
8. The thin film transistor array panel of claim 6, wherein the driving signal line further comprises a fourth signal line operable to transmit an initialization signal.
9. The thin film transistor array panel of claim 8, wherein the connection signal line connects at least one of the first, second, third, and fourth signal lines to the shift register.
10. The thin film transistor array panel of claim 1, wherein the connection assistance member comprises the same material as the pixel electrode.
11. The thin film transistor array panel of claim 1, wherein the connection assistance member connects the driving signal line and the connection signal line through a plurality of contact holes in the gate insulating layer and the passivation layer.
12. The thin film transistor array panel of claim 11, wherein the disconnection prevention member comprises a contact hole.
13. The thin film transistor array panel of claim 11, further comprising a capping layer disposed between the disconnection prevention member and the connection assistance member.
14. The thin film transistor array panel of claim 13, wherein the capping layer comprises a contact hole.
15. The thin film transistor array panel of claim 1, further comprising a capping layer disposed between the disconnection prevention member and the connection assistance member.
16. The thin film transistor array panel of claim 15, wherein the connection assistance member is disposed directly on the capping layer.
17. The thin film transistor array panel of claim 1, wherein a second side surface of the signal connection line has a tapered etching profile.
18. The thin film transistor array panel of claim 17, wherein the first and second side surfaces oppose one another on the signal connection line.

* * * * *